US009189189B2

(12) United States Patent
Sato

(10) Patent No.: US 9,189,189 B2
(45) Date of Patent: Nov. 17, 2015

(54) MOBILE TERMINAL, PRINTING APPARATUS AND COMPUTER-READABLE RECORDING MEDIUM STORING PROGRAM THEREFOR

(71) Applicant: BROTHER KOGYO KABUSHIKI KAISHA, Nagoya, Aichi (JP)

(72) Inventor: Hirokazu Sato, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/502,007

(22) Filed: Sep. 30, 2014

(65) Prior Publication Data

US 2015/0116753 A1 Apr. 30, 2015

(30) Foreign Application Priority Data

Oct. 25, 2013 (JP) .................. 2013-221688

(51) Int. Cl.
*G06F 3/12* (2006.01)
*H04N 1/00* (2006.01)
*H04W 4/02* (2009.01)

(52) U.S. Cl.
CPC ............ *G06F 3/1238* (2013.01); *G06F 3/1222* (2013.01); *G06F 3/1292* (2013.01); *H04N 1/00315* (2013.01); *H04W 4/023* (2013.01); *H04N 2201/006* (2013.01); *H04N 2201/0015* (2013.01); *H04N 2201/0055* (2013.01); *H04N 2201/0094* (2013.01)

(58) Field of Classification Search
USPC ........................................ 358/1.14
See application file for complete search history.

(56) References Cited

U.S. PATENT DOCUMENTS

2009/0052348 A1* 2/2009 Kato et al. .................... 370/254
2010/0069008 A1* 3/2010 Oshima et al. ............... 455/41.3
2013/0229684 A1* 9/2013 Yasuzaki ...................... 358/1.15

FOREIGN PATENT DOCUMENTS

JP  2007-166538 A   6/2007
JP  2010-262639 A   11/2010

* cited by examiner

*Primary Examiner* — Ngon Nguyen
(74) *Attorney, Agent, or Firm* — Scully, Scott, Murphy & Presser, PC

(57) ABSTRACT

A mobile terminal establishes a long distance wireless communication with a printing device in accordance with identification information communicated between the mobile terminal and the printing device using the near field communication. The mobile terminal transmits a print command to the printing device using one of the near field communication unit and the long distance communication unit. The mobile terminal determines, after the print command was transmitted, and transmits, to the printing device, using the long distance communication unit, a print termination command, when the mobile terminal is spaced from the printing device by the first distance.

16 Claims, 11 Drawing Sheets

MOBILE TERMINAL, PRINTING APPARATUS AND COMPUTER-READABLE RECORDING MEDIUM STORING PROGRAM THEREFOR

CROSS-REFERENCE TO RELATED APPLICATION

This application claims priority under 35 U.S.C. §119 from Japanese Patent Application No. 2013-221688 filed on Oct. 25, 2013. The entire subject matter of the application is incorporated herein by reference.

BACKGROUND

1. Technical Field

The following disclosures relate to a printing apparatus, a mobile terminal, and a computer-readable recording medium storing instructions to be executed by the mobile terminal.

2. Related Art

Recently, in order to enable communication between mobile terminals such as a smartphone, a tablet PC and a device having a printing function, a plurality of wireless communication methods are generally employed. Examples of such a wireless communication method is Bluetooth® which is a registered trademark of Bluetooth sig, Inc., Wi-Fi® which is a registered trademark of Wi-Fi Alliance, an NFC which is an abbreviation for a Near Field Communication, and the like. Further, a handover technique is suggested to make use of the plurality of wireless communication methods. For example, the NFC is used to establish a wireless communication between a mobile terminal and the printing device at an initial stage, and then, making use of the NFC communication, the communication method is switched to another method with which data can be transmitted/received at a higher speed than the NFC.

For example, given that a first communication device and a second communication device are to transmit/receive data, the first communication device first obtains a communication method and an encryption method from the second communication device using the NFC wireless communication. If the obtained communication method and the encryption method match the communication method and the encryption method of the first communication device, the first and second communication devices start the data communication using the communication method of which speed is higher than the NFC.

SUMMARY

It is possible to employ the handover technique to the data communication between the mobile terminal and the printing device. For example, the wireless communication is firstly established between the mobile terminal and the printing device using a slower-speed communication method, and after the communication therebetween has been established, image data is transmitted to the printing device using the higher-speed communication method. In such a case, however, a user may be apart from the printing device in spite of the image data is transmitted to the printing device. In such a case, printed sheets may be left at the printing device for a relatively long period, and confidentiality cannot be protected.

According to aspects of the disclosures, there is provided a non-transitory computer-readable recording medium of a mobile terminal having a near field communication unit configured to execute a near field wireless communication and a long distance communication unit configured to execute a long distance wireless communication, a communication distance of the long distance communication unit being longer than a communication distance of the near field communication. The recording medium stores instructions which, when executed, cause the mobile terminal to establish the long distance wireless communication between the mobile terminal and the printing device in accordance with identification information, the identification information being communicated between the mobile terminal and the printing device using the near field communication, transmit a print command to the printing device using one of the near field communication unit and the long distance communication unit, the print command being for initiating a printing operation to print an image based on image data stored in a storage of the mobile terminal, determine, after the print command was transmitted, whether the mobile terminal is spaced from the printing device by a first distance, and when it is determined that the mobile terminal is spaced from the printing device by the first distance, transmit to the printing device using the long distance communication unit, a print termination command instructing termination of the printing operation, According to aspects of the disclosures, there is also provided a mobile terminal, which is provided with a near field communication unit configured to execute a near field wireless communication with a printing device within a communicatable range, a long distance communication unit configured to execute a long distance wireless communication with the printing device, a communication distance of the long distance communication unit being longer than a communication distance of the near field communication, a storage device storing image information, and a processor. The processor is configured to execute instructions and cause the mobile terminal to establish the long distance wireless communication between the mobile terminal and the printing device in accordance with identification information, the identification information being communicated between the mobile terminal and the printing device using the near field communication, transmit a print command to the printing device using one of the near field communication unit and the long distance communication unit, the print command being for initiating a printing operation to print an image based on image data stored in a storage of the mobile terminal, determine, after the print command was transmitted, whether the mobile terminal is spaced from the printing device by a first distance, and when it is determined that the mobile terminal is spaced from the printing device by the first distance, transmit to the printing device using the long distance communication unit, a print termination command instructing termination of the printing operation.

According to further aspects of the disclosures, there is provided a printing device, which is provided with a near field communication unit configured to execute a near field wireless communication with a mobile terminal within a communicatable range, a long distance communication unit configured to execute a long distance wireless communication with the mobile terminal, a communication distance of the long distance communication unit being longer than a communication distance of the near field communication, and an on-printing device processor. The on-printing device processor being configured to execute instructions and cause the printing device to establish the long distance wireless communication between printing device and the mobile terminal in accordance with identification information, the identification information being communicated between the printing device and the mobile terminal using the near field communication, obtain a print command to initiate a printing operation to print an image based on image data obtained from the mobile terminal using one of the near field communication unit and the long distance communication unit, output information to execute printing images based on the image information obtained from the mobile terminal after the print command is obtained, determine whether the mobile terminal is spaced from the printing device by a first distance after printing is executed based on the print command obtained from the mobile terminal, and output information to stop printing images based on the image information obtained from the mobile terminal using the long distance communication unit when it is determined that the mobile terminal is spaced from the printing device by the first distance.

BRIEF DESCRIPTION OF THE ACCOMPANYING DRAWINGS

DETAILED DESCRIPTION OF THE EMBODIMENTS

<First Illustrative Embodiment>

Figure 1:
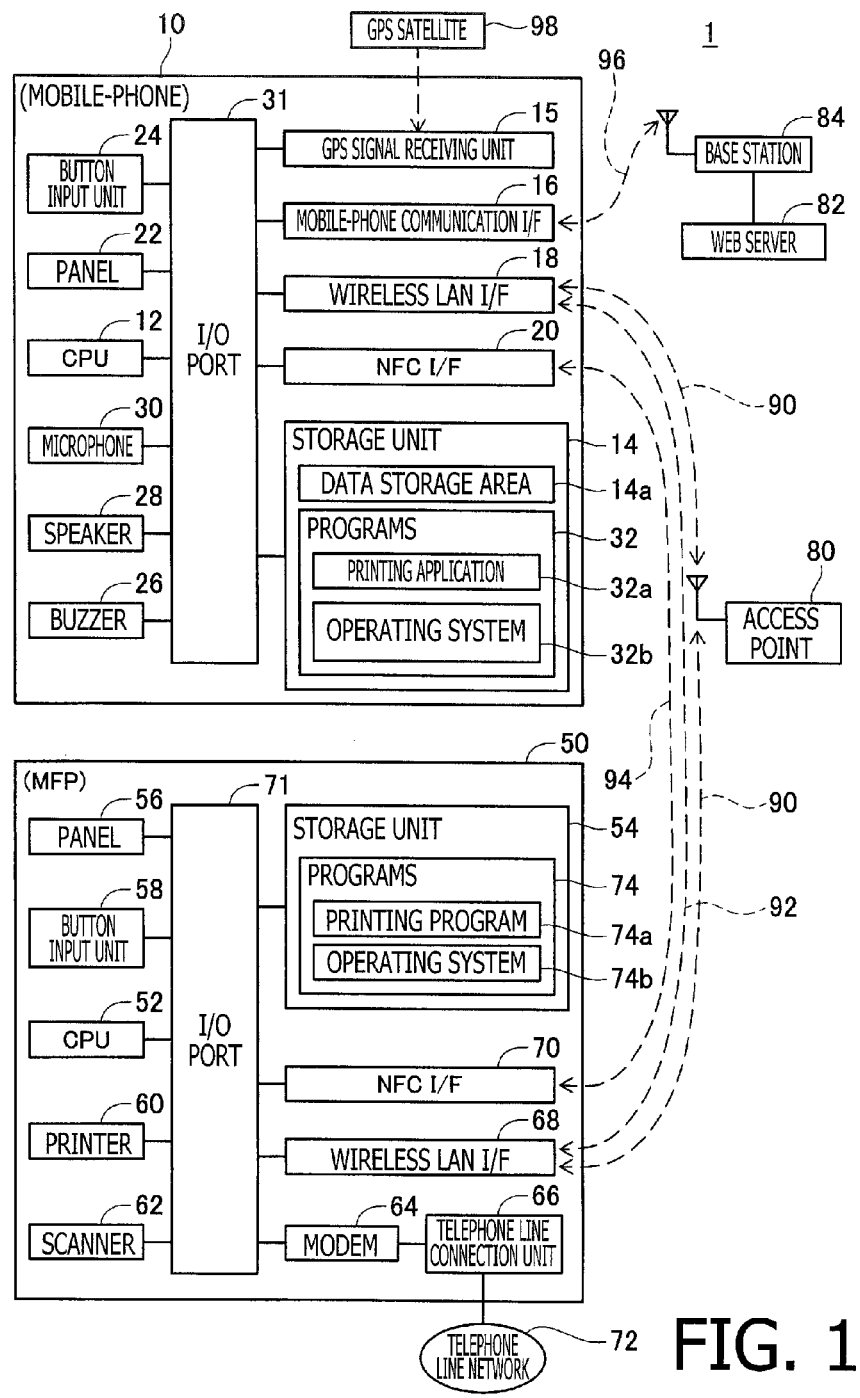
FIG. 1 is a block diagram of a communication system according to aspect of the disclosure.

A communication system 1 shown in FIG. 1 includes a mobile-phone 10, an MFP, which is an abbreviation for a multifunction peripheral, 50, an access point 80, a web server 82 and a base station 84. The mobile-phone 10 and the MFP 50 has a function of a wireless LAN, which is an abbreviation for a local area network, terminal device. Further, the MFP 50 is a peripheral device having a plurality of functions such as a printer function, a scanner function, a copier function and a facsimile function. The access point 80 has a function of a wireless LAN access point. The web server 82 is a device capable of providing its functions and data to a client terminal via a network. It is noted that the MFP 50 also has a function of a wireless LAN access point.

The mobile-phone 10 typically has a CPU, which is an abbreviation for a central processing unit, 12, a storage unit 14, a GPS signal receiving unit, a mobile-phone communication I/F 16, a wireless LAN I/F 18, an NFC I/F 20, a panel 22, a button input unit 24, a buzzer 26, a speaker 28 and a microphone 30. The above components are connected such that they communicate with each other via an input/output port 31.

The wireless LAN I/F 18 is configured to execute a Wi-Fi type (hereinafter, occasionally referred to as a WF method) wireless communication 90 in accordance with the standard 802.11 of the IEEE, which is a abbreviation for Institute of Electrical and Electronics, or ones in relation to the same. Thus, when the mobile-phone 10 access the access point 80 and be in a condition to use the WF wireless communication 90, the mobile-phone 10 is capable of executed the data communication with the MFP 50 via the access point 80.

The wireless LAN I/F 18 is capable of executing a wireless communication 92, which is a Wi-Fi direct type (hereinafter, also referred to as a WFD method) communication based on the IEEE 802.11 standard or one related thereto. That is, the mobile-phone 10 is capable of directly executing data communication with the MFP 50 if the mobile-phone 10 accesses the access point the MFP 50 has and executes the WFD wireless communication 92.

The NFC I/F 20 is configured to execute a wireless communication 94 in accordance with a standard ISO/IEC 21481 or ISO/IEC 18092, ISO being an abbreviation for International Organization for Standardization, and IEC being an abbreviation for International Electrotechnical Commission. When the mobile-phone 10 is in condition for executing the NFC wireless communication 94, the mobile-phone 10 can execute data communication directly with the MFP 50. However, in comparison with the WF wireless communication 90 or the WFD wireless communication 92, the communicatable distance is relatively short, and the communication speed is slow in the NFC wireless communication 94.

The mobile-phone I/F 16 is configured to execute a wireless communication 96 according to a mobile-phone communication method with the base station 84. That is, when the mobile-phone 10 is in a state where the wireless communication 96 according to the mobile-phone communication method, the mobile-phone 10 is capable of execute the data communication with the web server via the base station 84.

The CPU 12 executes processes in accordance with programs 32 stored in the storage unit 14. In the following description, however, instead of the CPU 12, a name of a program being executed may occasionally be referred to for brevity. For example, instead of stating that the CPU 12 execute a step of a printing application 32a, it would occasionally be stated that the printing application 32a executes a step. Incidentally, the storage unit 14 has RAM which is an abbreviation for a random access memory, a ROM which is an abbreviation for a read only memory, a flash memory, an HDD which is an abbreviation for a hard disk drive, and a buffer provided to the CPU 12, which are sued individually or in combination.

An OS which as an abbreviation for a operating system 32b is a program which provides various basic functions which are used in the printing application 32a. The OS 32b includes programs which execute the wireless communications 90, 92 and 94 via the mobile-phone I/F 16, a wireless LAN I/F 17, the wireless LAN I/F 18, and the NFC I/F 20, and programs controlling the storage unit 14, the panel 22, the button input unit 24, and the buzzer 26.

Further, the storage unit 14 includes a data storage area 14a. The data storage area 14a is used to store various pieces of data including a plurality of pieces of photograph data, document data, image data, map data and the like. The print application 32 output data to be stored in the data storage area 14a. Alternatively, the print application 32a retrieves various pieces of data stored in the data storage area 14a via the OS 32b.

The GPS signal receiving unit 15 receives signals from GPS satellites 98. The OS 32b calculates a position of the mobile-phone 10 based on the signals received from the GPS satellites 98. The printing application 32a obtains, via the OS 32b, data related to the position of the mobile-phone 10 as calculated.

The panel 22 has a display surface which displays functions of the mobile-phone 10. The printing application 32a outputs image data for display, and displays an image represented by the image data on the panel 22 via the OS 32b.

The button input unit 24 has a touch sensor which is formed integrally with the panel 22. The touch sensor detects approaching and contacting of an input medium with respect to the panel 22, and acquires a user operation of buttons. The printing application 32a obtains data representing user operation of the buttons via the OS 32b.

The buzzer 26 outputs alert sound. The printing application 32a causes the buzzer 26 to output the alert sound via the OS 32b.

The MFP 50 generally has a CPU 52, a storage unit 54, a panel 56, a button input unit 58, a printer 60, a scanner 62, a modem 64, a telephone network connection unit 66, a wireless LAN I/F 68 and an NFC I/F 70. These components are interconnected though an I/O port 71 so that they can communicate with each other.

The wireless LAN I/F 68 executes the WF wireless communication 90 in accordance with the IEEE 802.11 standard and/or one following the same. Similarly, the wireless LAN I/F 68 executes the WFD wireless communication 92 in accordance with the IEEE 802.11 standard and/or one following the same. The NFC I/F 70 executes the NFC type wireless communication 94 in accordance with the ISO/IEC 21481 or ISO/IEC 18092.

The CPU 52 executes various processes based on the programs 74 stored in the storage unit 54. In the following description, the CPU 52 executing the programs such as the CPU 52 executing the printing program 74a will occasionally be referred to simply by the name of the program. For example, the CPU 52 executing the printing program 74a will occasionally be referred to as the printing program 74a.

The storage unit 54 stores the programs 74. The programs 74 include the printing program 74a and an OS, which is an abbreviation for an operating system, 74b. The printing program 74a causes the CPU 52 to execute a process of printing an image with the printer 60 based on the image data stored in the data storage area 14a of the mobile-phone 10.

The OS 74b provides basic functions which is used by the printing program 74a. The OS 74b includes programs controlling the wireless LAN I/F 68 and the NFC I/F 70 to executes the wireless communication 90, 92 and 94, and programs controlling the storage unit 54, the panel 56 and the button input unit 58.

The panel 56 has display surface which displays various functions of the MFP 50. The printing program 74a outputs image data for display, and causes the panel 56 to display the image based on the image data via the OS 74b. The button input unit 58 has a touch sensor which is formed integrally with the panel 56. The touch sensor of the button input unit 58 detects approaching and contact of the input medium with respect to the panel 56 so as to acquire user operation of the buttons. The printing program 74a obtains data representing the user operation of the buttons via the OS 74b.

The printer 60 executes a printing operation. The scanner 62 executes a scanning operation. The modem 64 has a function of modulating image data to be transmitted with its facsimile function to signals which can be transmitted through the telephone network 72 and transmits the same through the telephone network connection unit 66. The modem 64 also has a function of demodulating the signal received through the telephone network 72 and the telephone network connection unit 66 to regenerate the original data.

Throughout the specification the terms "data" and "information" are used in accordance with the following definitions. That is, in the specification, the term "information" is used to have broader concept than the term "data." Therefore, "data A" could also be referred to as "information A." Further, even if there are plurality of pieces of "data" having different formats (e.g., a text format, a binary format, a flag format and the like), they are treated as the same "information" as long as the plurality of pieces of "data" represent the same content. For example, text-format data "COPY=2" representing that the number of copies to be printed is two and binary-format data "10" are treated as the same "information."

<Printing Process by MFP>

According to the communication system 1, simply by moving the mobile-phone 10 closer to the MFP 50, images represented by the image data stored in the data storage area 14a of the mobile-phone 10 can be printed with the MFP 50. That is, according to the communication system 1, it is possible to establish the NFC type wireless communication 94 by moving the mobile-phone 10 closer to the MFP 50, and transmit the image data from the mobile-phone 10 to the MFP 50 with the NFC type wireless communication 94, and print the image represented by the transmitted image data with the MFP 50.

More specifically, firstly the user moves the mobile-phone 10 closer to the NFC I/F 70 of the MFP 50. As the mobile-phone 10 approaches the MFP 50. When a distance between the mobile-phone 10 and the MFP 50 is within a communication range of the NFC type wireless communication 94, an initial sequence process of the NFC method is executed between the mobile-phone 10 and the MFP 50, and the NFC type wireless communication 94 is established therebetween.

When the NFC type wireless communication 94 is established, connection information for establishing the WF wireless communication 90 or the WFD wireless communication 92 is exchanged between the mobile-phone 10 and the MFP 50. It is noted that, with the WF wireless communication 90 and the WFD wireless communication 92, exchange of data can be executed faster than the NFC type wireless communication 94, and thus it is preferable to used the WF wireless communication 90 or the WFD wireless communication 92 to transmit/receive the image data. It is noted that a switching of the wireless communication to the WF wireless communication 90 or the WFD wireless communication 92 using the NFC type wireless communication 94 is referred to as a handover process.

Hereinafter, the handover process will be described. As connection information for establishing the WF wireless communication 90 or the WFD wireless communication 92, for example, an SSID, which is an abbreviation for Service Set Identifier, is known. When the SSID is used, the SSID is exchanged between the mobile-phone 10 and the MFP 50 using the NFC type wireless communication 94. That is, when the NFC type wireless communication 94 is established, an SSID using the wireless LAN I/F 18 of the mobile-phone 10 is transmitted from the mobile-phone 10 to the MFP 50 using the NFC type wireless communication 94.

When the SSID of the mobile-phone 10 is the same as the SSID of the MFP 50, the SSID and IP address of the MFP 50 is transmitted from the MFP 10 to the mobile-phone 10 using the NFC type wireless communication 94. Then, the WF wireless communication 90 or the WFD wireless communication 92 is established between the mobile-phone 10 and the MFP 50. When the SSID of the mobile-phone 10 and the SSID of the MFP 50 are different, the SSID to be used to access the access point of the MFP 50 and establish the WFD wireless communication 92 and a password are transmitted from the MFP 50 to the mobile-phone 10 using the NFC type wireless communication 94. Then, the mobile-phone 10 establish the WFD wireless communication 92 with the MFP 50 based on the SSID of the MFP 50.

When the WFD wireless communication 92 or the WF wireless communication 90 is established between the mobile-phone 10 and the MFP 50, the mobile-phone 10 transmits image data to the MFP 50 using the WFD wireless communication 92 or the WF wireless communication 90. At this occasion, together with the image data, a print command of an image is also transmitted using the WFD wireless communication 92, from the mobile-phone 10 to the MFP 50. Then, on the MFP 50 side, the image represented by the transmitted image data is printed.

<Termination of Printing Process of MFP>

As described above, according to the communication system 1, simply by moving the mobile-phone 10 closer to the MFP 50, it is possible to cause the MFP 50 to print an image represented by the image data stored in the data storage area 14a of the mobile-phone 10, which is very convenient for the user of the mobile-phone 10. It is noted that, in the related art, there is a chance that, after the user moves the mobile-phone 10 closer to the MFP 50 and starts the printing process, the mobile-phone 10 may be moved and located away from the MFP 50. In such a case, the printing process by the MFP 50 is executed although the user is not close to the MFP 50, and a sheet on which the image has been printed is discharged from the MFP 50. Thus, the sheet on which the image has been printed can be viewed by another person, and the security may not be appropriately kept. According to the illustrative embodiment, in order to avoid such a situation, when the mobile-phone 10 is moved away from the MFP 50 after it was once moved closer and the printing process was started, the printing process is terminated.

For example, it is firstly determined whether the mobile-phone 10 is spaced away from the MFP 50 by the predetermined distance. The communication system 1 is configured to determine whether the mobile-phone 10 is spaced away from the MFP 50 by the predetermined distance in accordance with each of three different methods, which will be described next.

<Determination Based on Position Information of Mobile-Phone>

First method is to use position information of the mobile-phone 10. As described above, the mobile-phone has the GPS signal receiving unit 15 for receiving the signals from the GPS satellites 98, and the position information of the mobile-phone 10, based on the signals, can be obtained easily. According to the first method, making use of the GPS function to obtain the position information of the mobile-phone 10 when the NFC wireless communication 94 is established between the mobile-phone 10 and the MFP 50. Thus obtained position information of the mobile-phone 10 is stored in the data storage area 14a as reference position information.

It is noted that the GPS signal receiving unit 15 is always receiving the signals from the GPS satellites 98, and the position information of the mobile-phone 10 is calculated, based on the signals, at relatively short intervals. There is no specific requirement regarding the timing at which the reference position information is obtained as long as the NFC type wireless communication 94 has been established between the mobile-phone 10 and the MFP 50, regardless whether the timing is before or after the WF wireless communication 90 or the WFD wireless communication 92 is established, or regardless whether the timing is before or after data (e.g., image data) is transmitted from the mobile-phone 10 to the MFP 50.

Even after the reference position information has been stored, new position information of the mobile-phone 10 is calculated at relatively short intervals. Then, a distance between the positions of the mobile-phone 10 based on the newly obtained position information and based on the reference position information. If the distance is equal to or more than the predetermined distance, it is determined that the mobile-phone 10 is spaced from the MFP 50 by the predetermined distance. According to the illustrative embodiment, the predetermined distance is 10 meters.

When it is determined that the mobile-phone 10 is spaced from the MFP 50 by the predetermined distance, the buzzer 26 outputs alert sound. By the alert sound, the user recognizes that the mobile-phone 10 is spaced from the MFP 50, and the user is encouraged to move closer to the MFP 50. If the alert sound continues for more than thirty seconds, that is, the mobile-phone 10 is spaced from the MFP 50 for more than thirty seconds and the user does not return to a location close to the MFP 50 during that period, a command for terminating the print process is transmitted from the mobile-phone to the MFP 50 with the WF wireless communication 90 or the WFD wireless communication 92. In response to the print process termination command. Upon receipt of the print process termination command, the MFP 50 terminates the print process. It is noted that, when a sheet is being conveyed inside the MFP 50, printing an image on the sheet inside the MFP 50 is allowed, but printing on the subsequent sheets will not be done and the print process is terminated after printing on the sheet which is being conveyed inside the MFP 50 is finished.

<Determination Based on WFD Wireless Communication>

The second determination method is to used the WFD wireless communication 92. According to the communication system 1, the image data and the print command can be transmitted using the WFD wireless communication 92. The strength of the signals of the wireless communication 92 is lower as the distance between the mobile-phone 10 and the MFP 50 is longer, while the strength is larger as the distance is shorter. In the data storage area 14a of the mobile-phone 10, an equation representing a relationship between the distance between the mobile-phone 10 and the MFP 50 and the strength of the signal of the wireless communication 92 as map data. Accordingly, by obtaining the signal strength of the WFD wireless communication 92, the distance between the mobile-phone 10 and the MFP 50 can be known from the map data. When the distance obtained from the map data is equal to or more than the predetermined distance, which is ten meters according to the illustrative embodiment, it is determined that the mobile-phone 10 is spaced from the MFP 50 by the predetermined distance.

Also in a case where the mobile-phone 10 is determined to be spaced from the MFP 50 by the predetermined distance based on the WFD wireless communication 92, the alert sound is output by the buzzer 26. Also in this case, the signal strength of the WFD wireless communication 92 is kept being obtained and the distance between the mobile-phone 10 and the MFP 50 is kept being calculated. When the calculated distance becomes 30 meters or more, a command for terminating the print process is transmitted from the mobile-phone 10 to the MFP 50 with the WFD wireless communication 92. The MFP 50 terminates the print process in response to receipt of the print termination command.

<Determination Based On NFC Type Wireless Communication>

The third method is to use the NFC type wireless communication 94. According to the communication system 1, the NFC type wireless communication 94 is established as the user moves the mobile-phone 10 closer to the MFP 50. The wireless communication 94 is established on the mobile-phone 10 is located within a communication range of the NFC type wireless communication 94, and the communication is disrupted (i.e., the mobile-phone 10 is disconnected from the MFP 50) when the mobile-phone 10 is located outside the communication range of the NFC type wireless communication 94. Accordingly, when the NFC type wireless communication 94 was once established and then disrupted, it is determined that the mobile-phone 10 is spaced from the MFP 50 by the predetermined distance (which corresponds to the communication range of the wireless communication 94).

It is noted that the establishment and disruption of the wireless communication 94 is determined based on whether data can be transmitted/received between the mobile-phone 10 and the MFP 50 using the wireless communication 94. For example, if predetermined data is transmitted from the mobile-phone 10 to the MFP 50 using the wireless communication 94, and the mobile-phone 10 has received a response to the transmission from the MFP 50, it is determined that the wireless communication 94 has been established. If predetermined data is transmitted from the mobile-phone 10 to the MFP 50 using the wireless communication 94, but the mobile-phone 10 has not received a response to the transmission from the MFP 50, it is determined that the wireless communication 94 is disrupted.

When it is determined that the mobile-phone 10 is spaced from the MFP 50 by the predetermined distance, a command to terminate the print process is transmitted from the mobile-terminal 10 to the MFP 50 using the WFD wireless communication 92 or the WF wireless communication 90. The MFP 50 terminates the print process in response to receipt of the print process termination command.

According to the third method, when the NFC type wireless communication 94 is disrupted, the print process is terminated. Therefore, in such a case, a message encouraging the user of the mobile-phone 10 to maintain the NFC type wireless communication 94, that is a message to encourage the user to keep the mobile-phone 10 within the communication range of the wireless communication 94 is displayed on the panel 22 of the mobile-phone 10. An example of the message may be "please keep putting the mobile-phone over the MFP." With this configuration, it becomes possible to prevent the user from carelessly moving away from the MFP 50, thereby security can be protected appropriately.

Further, according to the present method, whether the mobile-phone 10 is apart from the MFP 50 by the predetermined distance is determined when the number of sheets to be printed based on the image data transmitted from the mobile-phone 10 to the MFP 50 is two or more. In other words, only when the number of sheets to be printed is two or more, the print process is terminated as the user is apart from the MFP 50. It is because, chances are very low that the user moves away from the MFP 50 if the number of sheet to be printed is one.

<Selection of Determination Method>

As described above, the communication system 1 is configured to determine whether the mobile-phone 10 is spaced from the MFP 50 by the predetermined distance or not based on three different methods. Among the three determination methods, one based on the position information of the mobile-phone 10 using the GPS function is the most accurate in determining the distance between the mobile-phone 10 and the MFP 50. Therefore, if the mobile-phone 10 has the GPS function, this method is employed. That is, if the mobile-phone has the GPS function, based on the position information of the mobile-phone 10 using the GPS function, whether the mobile-phone 10 is spaced from the MFP 50 by the predetermined distance.

If the mobile-phone 10 does not have the GPS function, whether the mobile-phone 10 is away from the MFP 50 by the predetermined distance is determined based on the WFD wireless communication 92. It is noted that the WFD method communication 92 must be established using the wireless communication 92. That is, when the image data and the print command are transmitted from the mobile-phone 10 to the MFP 50, whether the mobile-phone 10 is spaced from the MFP 50 by the predetermined distance, based on the WFD wireless communication 92. If the image data and the print command are transmitted to the mobile-phone 10 to the MFP 50 using the WF wireless communication 90, whether the mobile-phone 10 is away from the MFP 50 by the predetermined distance based on the NFC type wireless communication 92.

<Printing Application>

The above described print process is executed as the printing application 32a is executed by the CPU 12 of the mobile-phone 10ds. Hereinafter, referring to FIGS. 2-6, a process of causing the MFP 50 to print the image based on the image data stored in the mobile-phone 10, and to stop printing if the user moves away from the MFP 50 during a printing operation.

Figure 2:
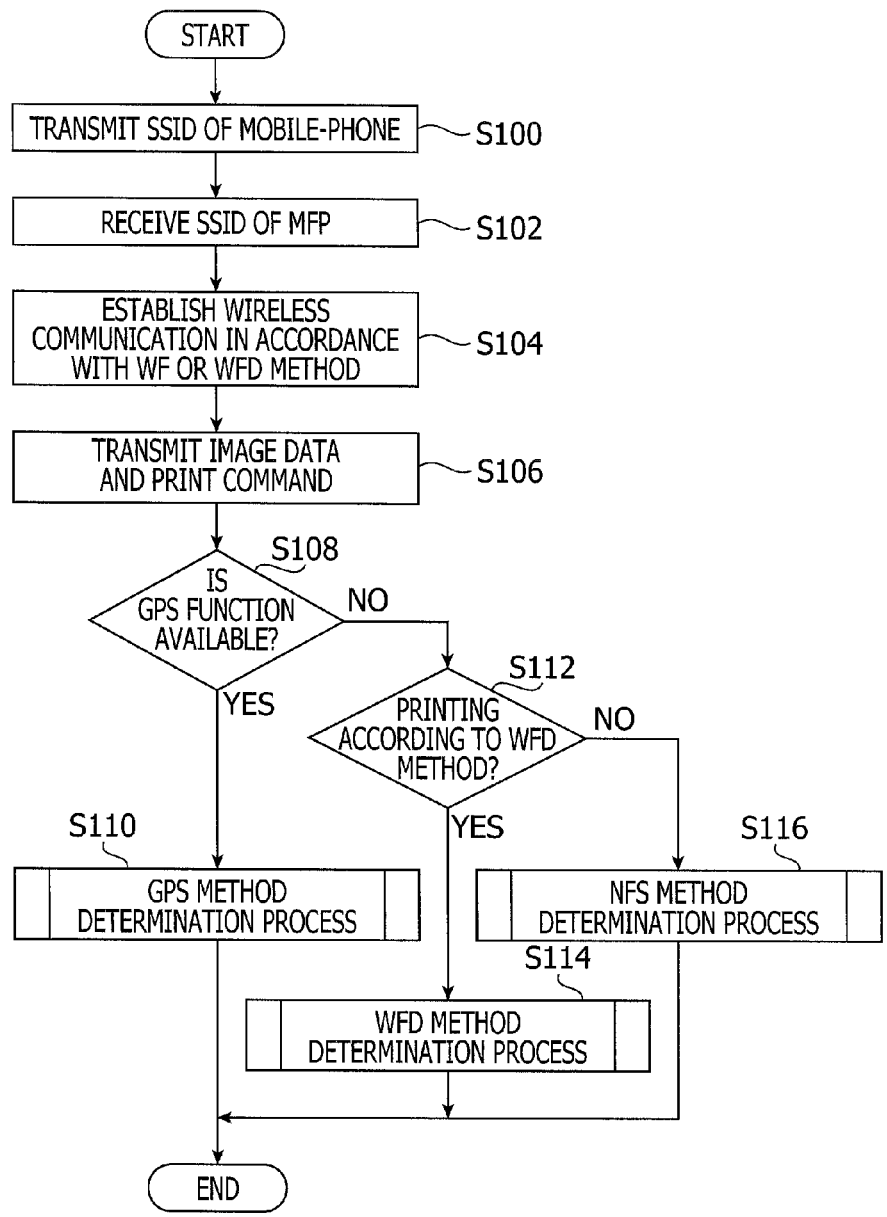
FIG. 2 is a flowchart illustrating a main process of a mobile-phone according to aspects of the disclosure.
Figure 3:
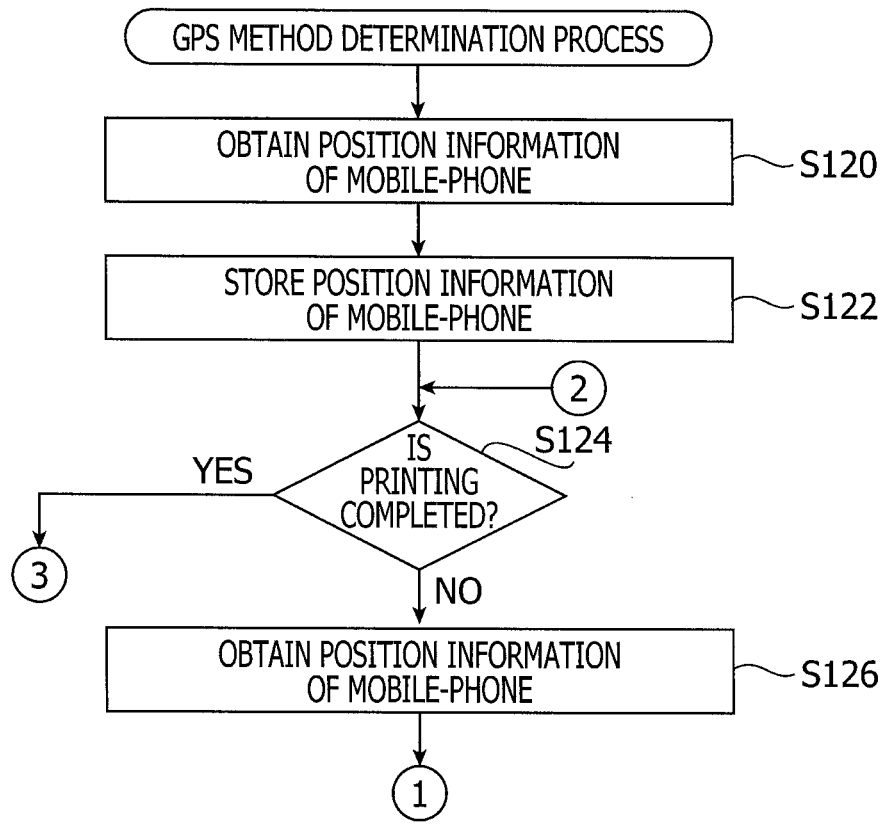
FIGS. 3 and 4 show a flowchart illustrating a GPS, which is an abbreviation for a Global Positioning System, method determination subroutine called in the main process shown in FIG. 2.
Figure 4:
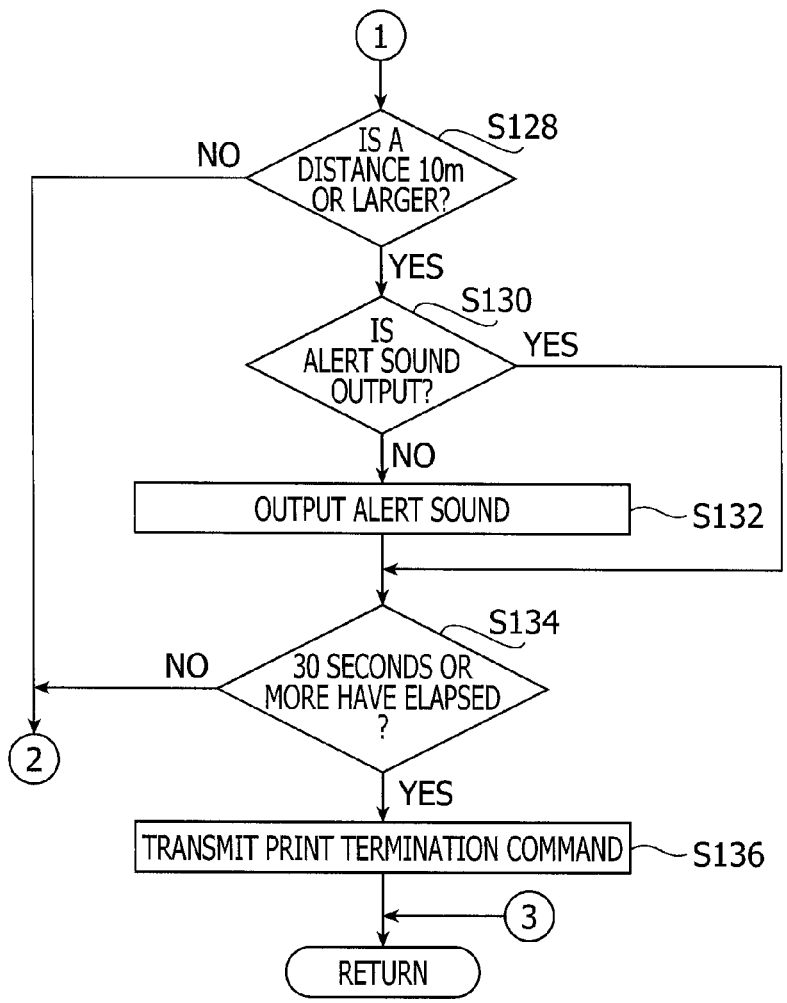
Figure 5:
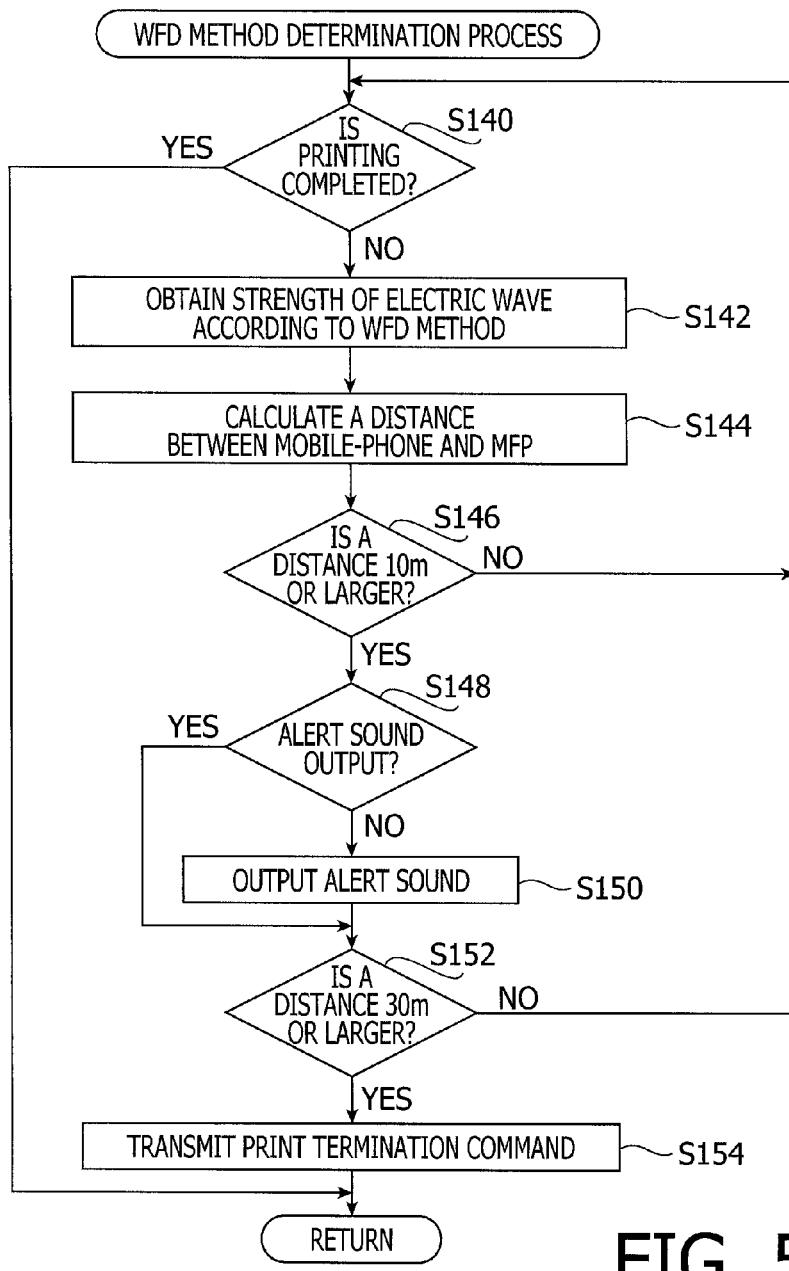
FIG. 5 shows a flowchart illustrating a WFD, which is an abbreviation for Wi-Fi Direct, method determination subroutine called in the main process shown in FIG. 2.
Figure 6:
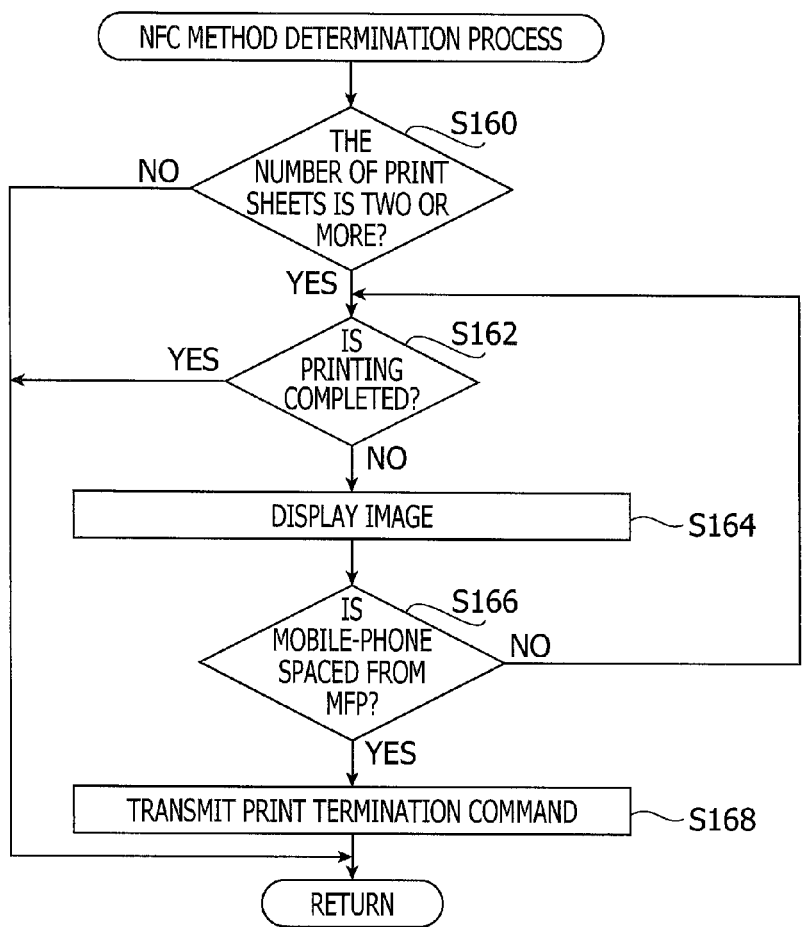
FIG. 6 shows a flowchart illustrating an NFC method determination subroutine called in the main process shown in FIG. 2.

When the mobile-phone 10 is moved close to the MFP 50 and the NFC type wireless communication 94 is established, a main flow illustrating in a flowchart shown in FIG. 2 is initiated. In S100 of the main flow, the CPU 12 outputs data for transmitting the SSID of the mobile-phone 10 to the MFP 50 using the NFC type wireless communication 94 through the OS 32b as described in <Printing by MFP> section. Thereafter, the process proceeds to S102. In S102, the CPU 12 obtains the SSID of the MFP 50 transmitted therefrom using the wireless communication 94 via the OS 32b. Then, the process proceeds to S104.

In S104, the CPU 12 transmits the data for establishing the WF wireless communication 90 or the WFD wireless communication 92 with the MFP 50, via the OS 32b. Then, the process proceeds to S106. In S106, the CPU 12 outputs data for transmitting the image data stored in the data storage area 14a and the print command for print the image based on the image data through the OS 32b using the WF wireless communication 90 or the WFD wireless communication 92.

In S108, the CPU 12 determines whether the mobile-phone 10 has the GPS function (i.e., a function to receive the signals from the GPS satellites 98 and calculate the position information of the mobile-phone 10). If the mobile-phone 10 has the GPS function (S108: YES), the process proceeds to S110 and a GPS method determination process, which is a subroutine, is executed.

In the GPS method determination process, the CPU 12 obtains the position information of the mobile-phone 10 in S120 through the OS 32b as described in a section of <Determination Based on Position Information of Mobile-phone>. Then, in S122, the CPU 12 outputs data for causing the position information of the mobile-phone 10 in the data storage area 14a through the OS 32b. Then, the process proceeds to S124.

In S124, the CPU 12 determines whether printing based n the image data transmitted from the mobile-phone 10 has been completed. According to the illustrative embodiment, the CPU 12 obtains the information indicating whether the printing based on the image data transmitted from the mobile-phone 10 has been completed or not from the MFP 50 using the WF wireless communication 90 or the WFD wireless communication 92, and judges whether the printing operation has been completed based on the obtained information. If the printing operation has been completed (S124: YES), the GPS method determination process and the process of the printing application 32*a* are terminated. If the printing operation has not been completed yet (S124: NO), the process proceeds to S126. In S126, the CPU 12 obtains the position information of the mobile-phone 10 through the OS 32*b*, and the process proceeds to S128.

In S128, the CPU 12 calculates a distance between a position based on the reference position information stored in the data storage area 14*a* and the position based on the position information obtained in S126, as described in a section of <Determination based on Position Information of Mobile-Phone>, and determines whether the distance is equal to or greater than 10 meters. If the distance is less than 10 meters (S128: NO), the process returns to S124.

If the distance is 10 meters or more (S128: YES), the process proceeds to S130. In S130, the CPU 12 determines whether the alert sound is being output by buzzer 26. If the alert sound is not being output (S130: NO), the process proceeds to S132. In S132, the CPU 12 outputs data causing the buzzer 26 to output the alert sound through the OS 32*b*. Then, the process proceeds to S134. If the alert sound is being output (S130: YES), the process skips S132 and proceeds to S134.

In S134, the CPU 12 determines whether 30 seconds or more have elapsed since the distance became 10 meters or more. If the elapsed time period is less than 30 seconds (S134: NO), the process returns to S124. If the elapsed time period is 30 seconds or more (S134: YES), the process proceeds to S136. In S136, the CPU 12 outputs a command to be transmitted to the MFP 50 using the WF wireless communication 90 or the WFD wireless communication 92 to stop the printing operation, through the OS 32*b*. Thereafter, the GPS method determination process and the printing application 32*a* are terminated.

If the mobile-phone 10 does not have the GPS function (S108: NO), the process proceeds to S112. It is noted that the process may determine that the determination at S108 is "NO" when the mobile-phone 10 has the GPS function but it is not set to be available. It is also noted that the process may determined that the determination at S108 is "NO" whne the mobile-phone 10 has the GPS function and it is set to be available, but a signal reception condition of the GPS signals is not good. In S112, the CPU 12 determines whether the printing operation currently being executed is one using the WFD wireless communication 92 (i.e., whether the image data and the like are transmitted using the WFD wireless communication 92). If the currently executed printing operation is one using the WFD wireless communication (S112: YES), the process proceeds to S114. In S114, the CPU 12 executes a WFD method determination process. It is noted that S112 and S114 may be omitted. That is, when the determination at S108 is "NO," the process may proceed to S116.

In the WFD method determination process, the CPU 12 determines whether the printing operation of printing the images based on the image data transmitted from the mobile-phone 10 has been completed in S140. If the printing operation has been completed (S140: YES), the WFD method determination process and the printing application 32*a* are terminated. If the printing operation has not been completed yet (S140: NO), the process proceeds to S142. In S142, the CPU 12 obtains the signal strength of the WFD wireless communication 92 in accordance with the WFD wireless communication 92, as described in a section of <Determination based on WFD Wireless communication>. Thereafter, the process proceeds to S144.

In S144, the CPU 12 calculates a distance between the MFP 50 and the mobile-phone 10 which corresponds to the obtained signal strength of the WFD wireless communication 92 using the map data stored in the data storage area 14*a*. Then, the process proceeds to S146. In S146, the CPU 12 determines whether the calculated distance is equal to or more than 10 meters. If the distance is less than 10 meters (S146: NO), the process returns to S140. If the distance is 10 meters or more (S146: YES), the process proceeds to S148.

In S148, the CPU 12 determines whether the buzzer 26 is outputting the alert sound. If the alert sound is not being output (S148: NO), the process proceeds to S150. In S150, the CPU 12 outputs data for causing the buzzer 26 to output the alert sound through the OS 32*b*. Thereafter, the process proceeds to S152. If the alert sound is being output (S148: YES), the process proceeds to S152, skipping S150.

In S152, the CPU 12 determines whether the distance calculated in S144 is equal to or more than 30 meters. If the distance is less than 30 meters (S152: NO), the process returns to S140. If the distance is 30 meters or more (S152: YES), the process proceeds to S154. In S154, the CPU 12 outputs data for transmitting a command to stop the printing operation to the MFP 50 using the WFD wireless communication 92 through the OS 32*b*. Thereafter, the WFD method determination process and the printing application 32*a* are terminated.

If the currently executed printing operation is not one using the WFD wireless communication 92 (S112: NO), the process proceeds to S116. In S116, the CPU 12 executes the NFC method determination process. In the NFC method determination process, the CPU 12 determines whether the number of sheets to be printed based on the image data transmitted from the mobile-phone 10 is two or more in S160. If the number of sheets to be printed is one (S160: NO), the NFC determination process and the printing application 32*a* are terminated. If the number of sheets to be printed is two or more (S160: YES), the process proceeds to S162.

In S162, the CPU 12 determines whether the printing operation based on the image data transmitted from the mobile-phone 10 has been completed. If the printing operation has been completed (S162: YES), the NFC method determination process and the printing application 32*a* are terminated. If the printing operation has not been completed yes (S162: NO), the process proceeds to S164. In S164, the CPU 12 outputs data for displaying a message "please keep putting the mobile-phone over the MFP" through the OS 32*b*, as described in a section of <Determination based on NFC Wireless communication>. Thereafter, the process proceeds to S166.

In S166, the CPU 12 determines whether the mobile-phone 10 is moved away from the MFP 50, that is, whether the NFC wireless communication 94 is being established or disrupted. If the NFC wireless communication 94 has been established (S166: NO), the process returns to S162. If the NFC wireless communication 94 has been disrupted (S166: YES), the process proceeds to S168. In S168, the CPU 12 outputs data for transmitting a command to stop the printing operation to the MFP 50 using the WFD wireless communication 90 or the WFD wireless communication 92 through the OS 32*b*. Thereafter, the NFC method determination process and the printing application 32*a* are terminated.

<Second Illustrative Embodiment>

Hereinafter, a communication system according to a second illustrative embodiment will be described. It is noted that the hardware structure of the communication system according to the second illustrative embodiment is the same as that of the first illustrative embodiment. Therefore, description of the hardware structure of the second illustrative embodiment will not be provided for brevity.

According to the first illustrative embodiment, determination whether the mobile-phone 10 is spaced from the MFP 50 by the predetermined distance or not is made by the mobile-phone 10. In contrast, according to the second illustrative embodiment, the determination is made by the MFP 50. Methods of such a determination according to the second illustrative embodiment is substantially the same as those of the first illustrative embodiment. That is, when the print process using the NFC wireless communication 94 is being executed, the MFP 50 determines whether the mobile-phone 10 is spaced from the MFP 50 by the predetermined amount based on one of the position information of the mobile-phone 10, the WFD wireless communication 92, and the NFC wireless communication 94. Further, on condition that the mobile-phone 10 is spaced from the MFP 50 by the predetermined distance, the print process is terminated. The print process and termination of the print process are executed as the CPU 52 executes a printing program 74a of the MFP 50.

Figure 7:
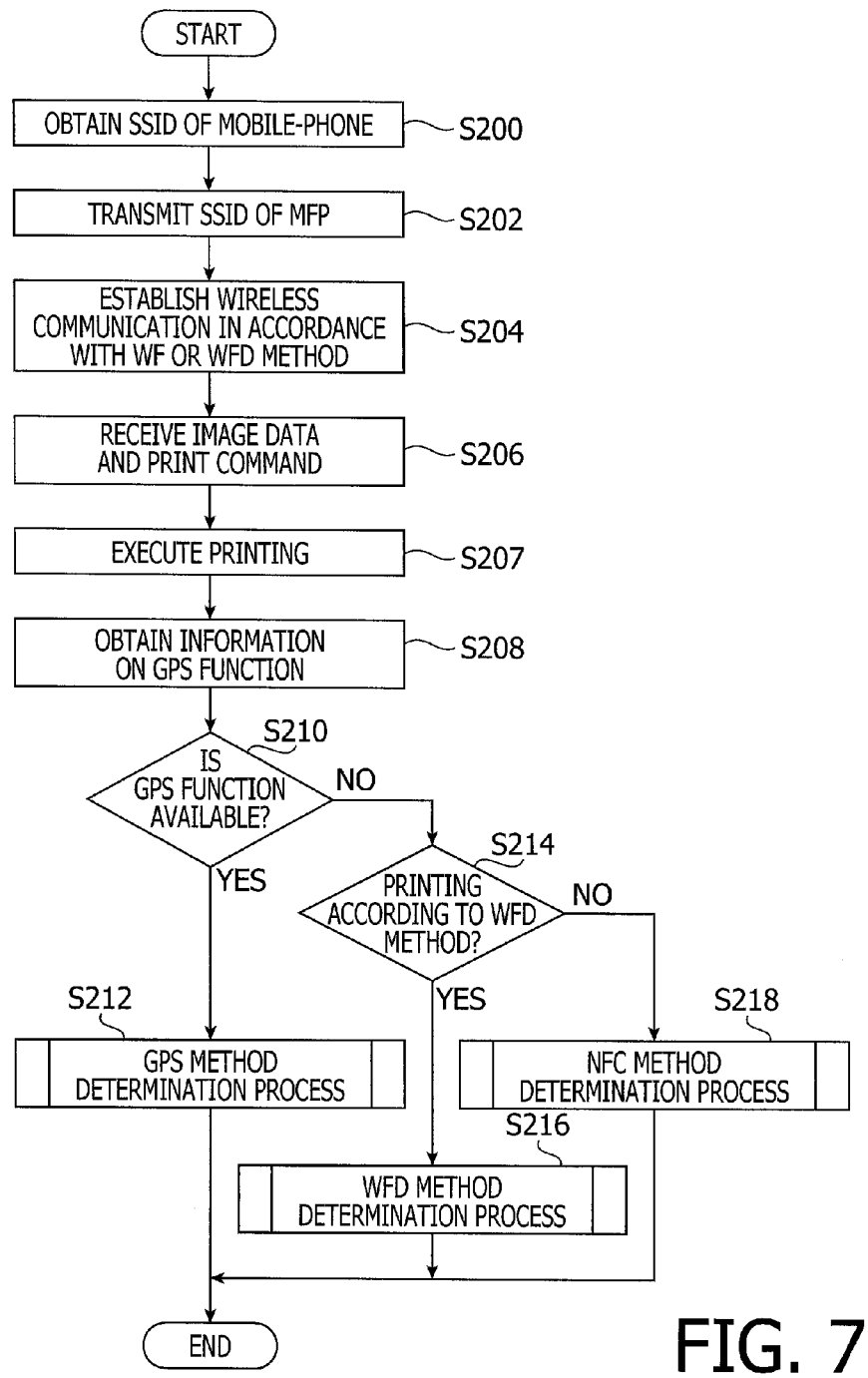
FIG. 7 shows a flowchart illustrating a main process of the MFP according to aspects of the disclosure.
Figure 8:
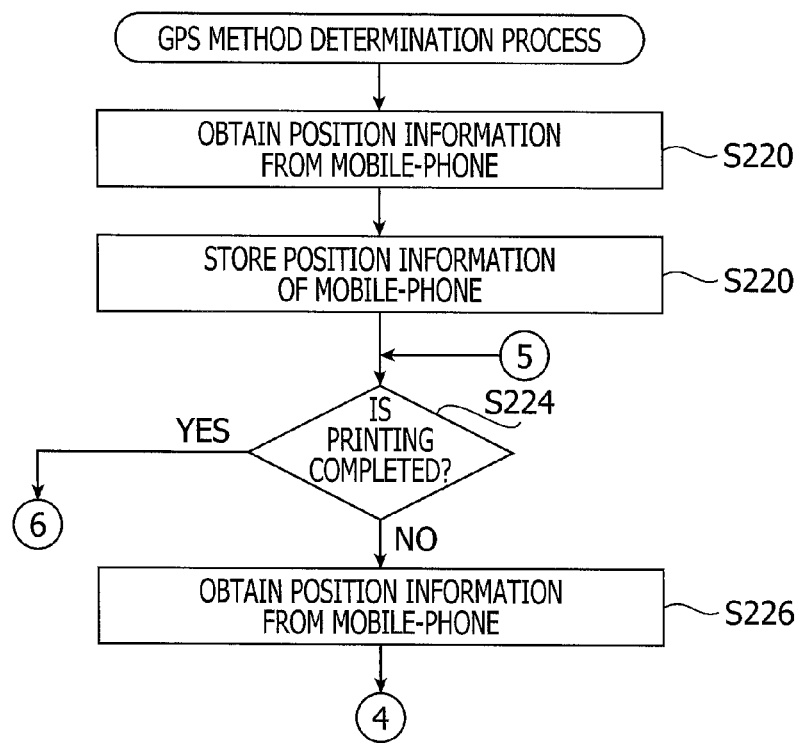
FIGS. 8 and 9 show a flowchart illustrating a GPS method determination process which is a subroutine called in the main process shown in FIG. 7.
Figure 9:
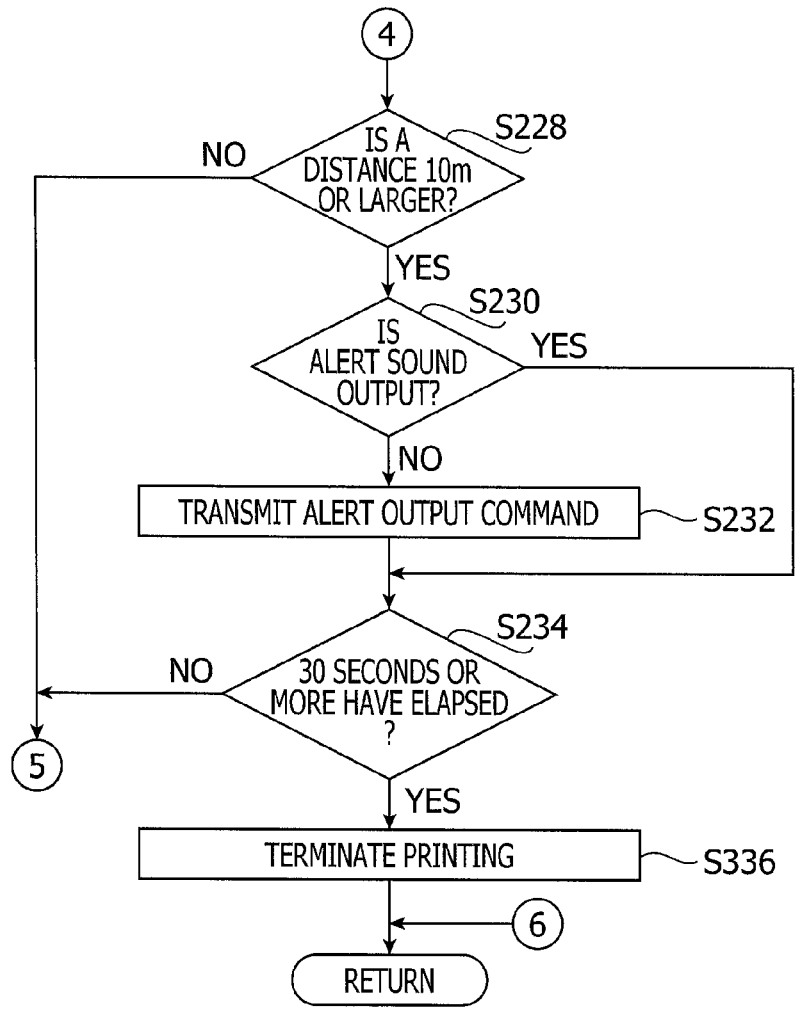
Figure 10:
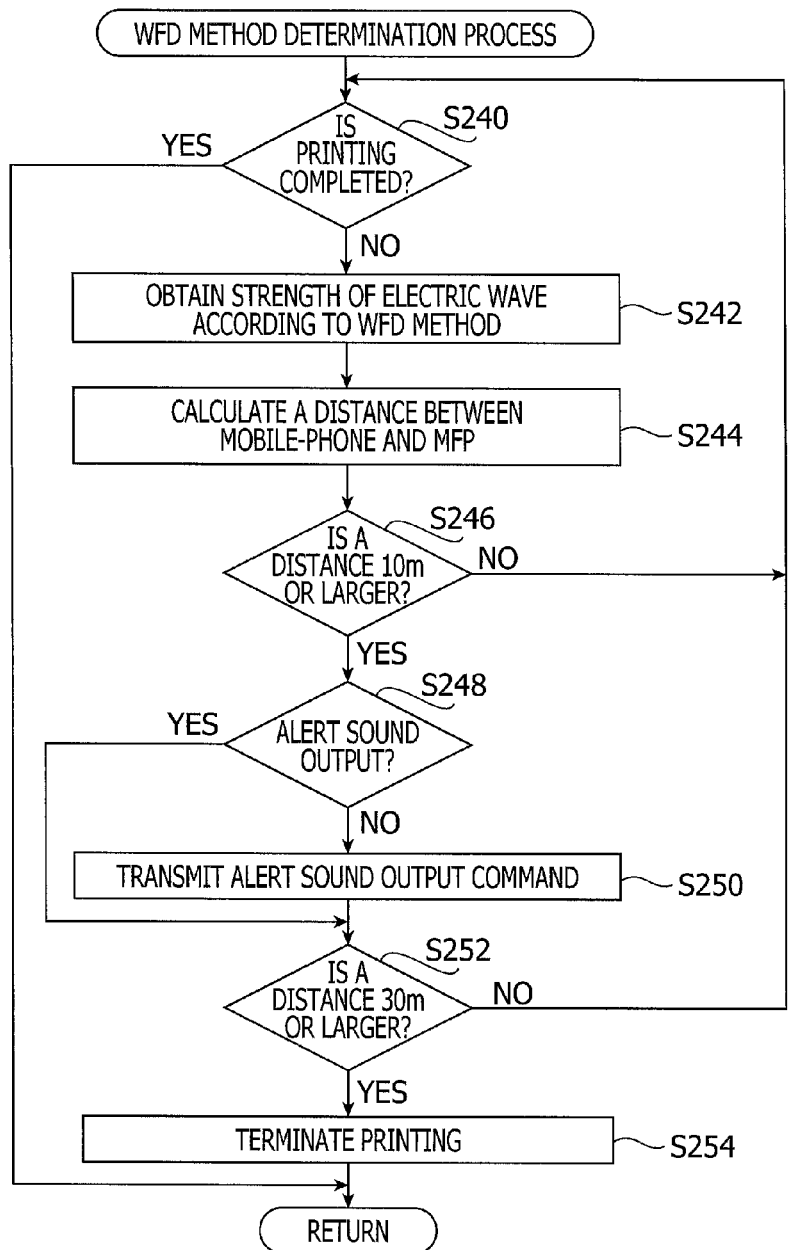
FIG. 10 shows a flowchart illustrating a WFD method determination process which is a subroutine called in the main process shown in FIG. 7.
Figure 11:
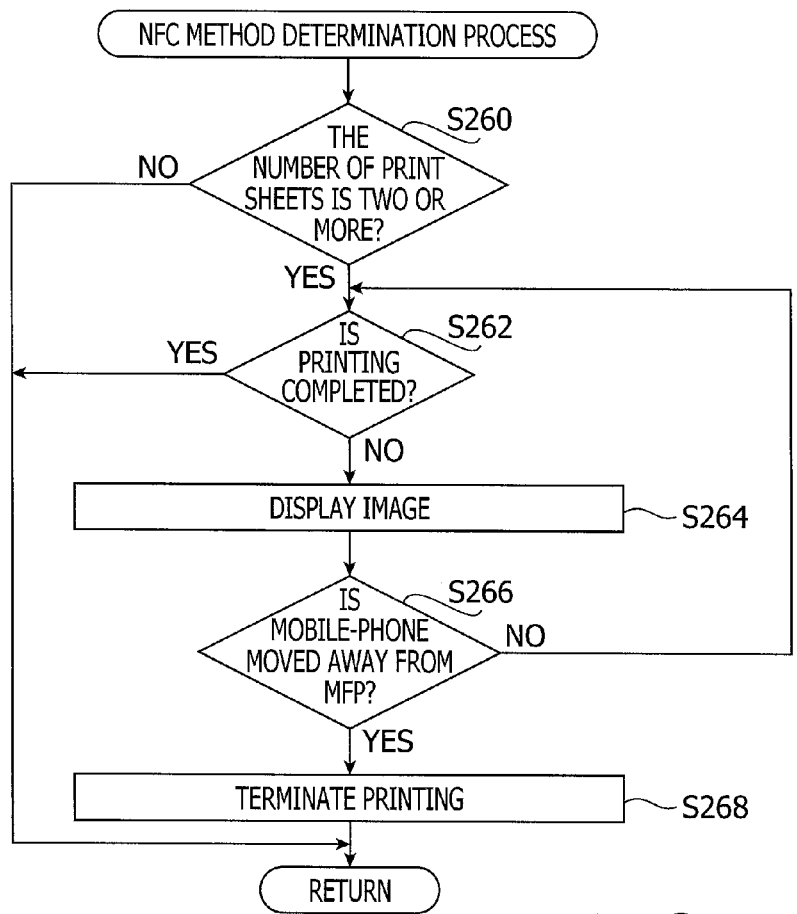
FIG. 11 shows a flowchart illustrating an NFC method determination process which is a subroutine called in the main process shown in FIG. 7.

When the mobile-phone 10 is located close to the MFP 50 and the NFC wireless communication 94 is established, a main flow shown in FIG. 7 is initiated. In S200 of the flowchart shown in FIG. 7, the CPU 52 obtains the SSID of the mobile-phone 10 transmitted from the mobile-phone 10 using the NFC wireless communication 94 through the OS 74b. Thereafter, the process proceeds to S202. In S202, the CPU 52 outputs data for transmitting the SSID of the MFP 50 to the mobile-phone 10 using the NFC wireless communication 94 through the OS 74b. Thereafter, the process proceeds to S204.

In S204, the CPU 52 outputs data for establishing the WF wireless communication 90 or the WFD wireless communication 92 between the mobile-phone 10 and the MFP 50 through the OS 74b. Then the process proceeds to S206. In S206, the CPU 52 receives the image data and print command of images based on the image data, which are transmitted from the mobile-phone 10 using the WF wireless communication 90 or the WFD wireless communication 92 through the OS 74b. Then, the process proceeds to S207. In S207, the CPU 52 outputs data causing the printer 60 to print the received image data through the OS 74b. Thereafter, the process proceeds to S208.

In S208, the CPU 52 obtains information regarding the GPS function of the mobile-phone 10 indicating whether the mobile-phone 10 has the GPS function, using the WF wireless communication 90 or the WFD wireless communication 92, through the OS 74b. Then, the process proceeds to S210. In S210, the CPU 52 determines whether the mobile-phone 10 has the GPS function based on the information obtained in S208. If the mobile-phone 10 has the GPS function (S210: YES), the process proceeds to S212. In S212, the CPU 52 executes the GPS method determination process. It is noted that the process may determine that the determination at S210 is "NO" when the mobile-phone 10 has the GPS function but it is not set to be available. It is also noted that the process may determined that the determination at S210 is "NO" whne the mobile-phone 10 has the GPS function and it is set to be available, but a signal reception condition of the GPS signals is not good.

In the GPS method determination process, the CPU 52 obtains the position information of the mobile-phone 10 from the mobile-phone 10 using the WF wireless communication 90 or the WFD wireless communication, through the OS 74b. Then, the process proceeds to S222. In S222, the CPU 52 outputs data for storing the position information of the mobile-phone 10 obtained in S220 in the storage unit 54, through the OS 74b. Thereafter, the process proceeds to S224.

In S224, the CPU 52 determines whether the printing operation of the images based on the image data transmitted from the mobile-phone 10 has been completed. If the printing operation has been completed (S224: YES), the GPS method determination process and the printing program 74a are terminated. If the printing operation has not been completed yet (S224: NO), the process proceeds to S226. In S226, the CPU 52 obtains the position information of the mobile-phone 10 therefrom using the WF wireless communication 90 or the WFD wireless communication 92, through the OS 74b. Thereafter, the process proceeds to S228.

In S228, the CPU 52 calculates a distance between a position based on the position information of the mobile-phone 10 stored in the storage unit 54, that is, the position based on the reference position information, and a position based on the position information obtained in S226, and determines whether the distance is equal to or more than 10 meters or not. If the distance is less than 10 meters (S228: NO), the process returns to S224.

If the distance is equal to or more than 10 meters (S228: YES), the process proceeds to S230. In S230, the CPU 52 determines whether the buzzer 26 of the mobile-phone 10 is outputting the alert sound. According to the second illustrative embodiment, the CPU 52 obtains information regarding an operation status of the buzzer 26 from the mobile-phone 10 using the WF wireless communication 90 or the WFD wireless communication 92, and determines whether the alert sound is being output by the buzzer 26 based on the thus obtained information. If the alert sound is not being output (S230: NO), the process proceeds to S232. In S232, the CPU 52 outputs data, through the OS 74b, for transmitting a command causing the buzzer 26 to output the alert sound using the WF wireless communication 90 or the WFD wireless communication 92. Then, the process proceeds to S234. If the alert sound is being output (S230: YES), the process proceeds to S234, skipping S232.

In S234, the CPU 52 determines whether 30 seconds or more have elapsed since the distance between the mobile-phone 10 and the MFP 50 became 10 meters or more. If the elapsed time period is less than 30 seconds (S234: NO), the process returns to S224. If the elapsed time period is 30 seconds or more (S234: YES), the process proceeds to S236. In S236, the CPU 52 outputs data for terminating the print operation through the OS 74b. Thereafter, the GPS method determination process and the printing program 74a are terminated.

If the mobile-phone 10 does not have the GPS function (S210: NO), the process proceeds to S214. In S214, the CPU 52 determines whether the print process currently being executed is one using the WFD wireless communication 92, that is, whether the image data and the like was received using the WFD wireless communication 92. If the currently executed print process is one using the WFD wireless communication 92 (S214: YES), the process proceeds to S216. In S216, the CPU 52 executes a WFD method determination process. It is noted that S214 and S216 may be omitted. That is, when the determination at S210 is "NO," the process may proceed to S218.

In the WFD method determination process, the CPU 52 determines whether printing of images based on the image data transmitted from the mobile-phone 10 has been completed in S240. If the printing operation has been completed (S240: YES), the WFD method determination process and the printing program 74a are terminated. If the printing operation has not been completed yet (S240: NO), the process proceeds to S242. In S242, the CPU 52 obtains the signal strength of the WFD wireless communication 92 through the OS 74b. Thereafter, the process proceeds to S244.

In S244, the CPU 52 calculates a distance between the mobile-phone 10 and the MFP 50 corresponding to the signal strength of the WFD wireless communication 92 obtained in S242 using the map data stored in the storage unit 54. It is noted that the map data stored in the storage unit 54 is the same as the map data stored in the data storage area 14a of the mobile-phone 10. Then, the process proceeds to S246. In S246, the CPU 52 determines whether the calculated distance is equal to or more than 10 meters or not. If the distance is less than 10 meters (S246: NO), the process returns to S240. If the distance is 10 meters or more (S246: YES), the process proceeds to S248.

In S248, the CPU 52 determines whether the alert sound is being output by the buzzer 26 of the mobile-phone 10 as in S230. If the alert sound is not being output (S248: NO), the process proceeds to S250. In S250, the CPU 52 outputs data for transmitting a command causing the buzzer 26 to output the alert sound to the mobile-phone 10 using the WF wireless communication 90 or the WFD wireless communication 92, through the OS 74b. Then, the process proceeds to S252. If the alert sound is being output (S248: YES), the process proceeds to S252, skipping S250.

In S252, the CPU 52 determines whether the distance between the mobile-phone 10 and the MFP 50 calculated in S244 is equal to or more than 30 meters. If the distance is less than 30 meters (S252: NO), the process returns to S240. If the distance is 30 meters or more (S252: YES), the process proceeds to S254. In S254, the CPU 52 outputs a command to stop the printing operation through the OS 74b. Thereafter, the WFD method determination process and the printing program 74a are terminated.

If the currently executed printing operation is not one using the WFD wireless communication 92 (S214: NO), the process proceeds to S218. In S218, the CPU 52 executes the NFC method determination process. In the NFC method determination process, the CPU 52 determines whether the number of sheets to be printed based on the image data transmitted from the mobile-phone 10 is two or more in S260. If the number of sheets to be printed is one (S260: NO), the NFC method determination process and the printing program 74a are terminated. If the number of sheets is two or more (S260: YES), the process proceeds to S262.

In S262, the CPU 52 determines whether printing of images based on the image data transmitted from the mobile-phone 10 has been completed. If the print operation has been completed (S262: YES), the NFC method determination process and the printing program 74a are terminated. If the printing operation has not been completed yes (S262: NO), the process proceeds to S264. In S264, the CPU 52 outputs data for displaying a message "please keep putting the mobile-phone over the MFP" on the panel 56, through the OS 74b. Thereafter, the process proceeds to S266.

In S266, the CPU 52 determines whether the mobile-phone 10 is spaced from the MFP 50 by the predetermined distance, that is, whether the NFC wireless communication 94 has been established or disrupted. If the NFC wireless communication 94 has been established (S266: NO), the process returns to S262. If the NFC wireless communication 94 has been disrupted (S266: YES), the process proceeds to S268. In S268, the CPU 52 outputs a command to stop the printing operation through the OS 74b. Thereafter, the NFC method determination process and the printing program 74a are terminated.

<Modifications>

According to the above-described illustrative embodiments, when the mobile-phone 10 is spaced from the MFP 50 by the predetermined distance, and another condition is satisfied (e.g., when the spaced state has been kept for 30 seconds), the printing operation of the MFP 50 is terminated. This configuration can be modified such that the printing operation of the MFP 50 may be terminated simply when the mobile-phone 10 is moved away and spaced from the MFP 50 by the predetermined distance.

According to the illustrative embodiments described above, whether the mobile-phone 10 is spaced from the MFP 50 by the predetermined distance is determined using the map data which represents mathematization of a relationship between the signal strength of the WFD wireless communication 92 and the distance between the mobile-phone 10 and the MFP 50. Such a configuration may be modified such that the decision is made based only on the signal strength of the wireless communication 92. For example, the signal strength when the wireless communication 92 was established is stored as a reference strength, and it is determined that the mobile-phone 10 is spaced from the MFP 50 by the predetermined distance when the signal strength of the wireless communication 92 becomes X % or less, where X is a predetermined real number less than 100. It is noted that the number X should be determined in advance to meet the "predetermined distance."

Further, according to the illustrative embodiments, the alert sound of the buzzer 26 is used to notify the user that the mobile-phone 10 is spaced from the MFP 50 by the predetermined distance. Optionally or alternatively, a message displayed on the panel 22, a voice message or guidance, vibration of the mobile-phone 10, lighting with a predetermined color, blinking of light and the like can be employed for the notification. Further, according to the illustrative embodiments, messages are displayed on the panels 22 and 56 when it is determined whether the mobile-phone 10 is spaced from the MFP 50 by the predetermined distance. This configuration can be modified such that voice messages may be optionally or alternatively employed.

According to the illustrative embodiment, if the print termination command is issued when a printing operation is being executed with respect to a sheet, the printing operation is terminated after printing operation with respect to the sheet is completed. However, the invention needs not be limited to such a configuration, and can be modified to stop printing on the process of printing.

According to the illustrative embodiments, the print command is transmitted using the WF wireless communication 90 or the WFD wireless communication. It is noted that the invention needs not be limited to this configuration and the print command may be transmitted using the NFC wireless communication 94.

It is noted that any mobile terminal (e.g., a tablet, a smartphone and the like) as well as the mobile-phone 10 can be used as a mobile-terminal which transmits the image data to the MFP 50.

It is also noted that an apparatus that receives the image data and print command, and executes a printing operation needs not be limited to the MFP 50, and any printable apparatuses can be employed.

According to the illustrative embodiments, as a near-distance wireless communication, the NFC wireless communication is employed. The invention needs not be limited to such a configuration, and TransferJet® which is a registered trademark for Sonny Corporation may be employed. In this case, as a wireless communication which is established with the handover process, various methods of the wireless communication of which transmission speed is higher than that of the TransferJet® may be employed. Further, optionally or alternatively, as a wireless communication which is established with the handover process, various methods of the wireless communication of which communication range is longer than that of the TransferJet® may be employed.

According to the illustrative embodiments, the CPU 12 of mobile-phone 10 executes processes based on the printing application 32a, and the CPU 52 of the MFP 50 executes processes based on the printing program 74a. It is noted, however, the invention needs not be limited to such a configuration. For example, the CPU 12, which operates based on the printing application 32a, may be configured to causes the OS 32b, other systems, hardware components to execute various operations/processes. Similarly, the CPU 52, which operates based on the printing application 74a, may be configured to causes the OS 74b, other systems, hardware components to execute various operations/processes.

In the illustrative embodiments described above, the processes shown in FIGS. 2-6 are executed as the printing application 32a is executed. These flowcharts may be modified such that steps S108, S112-S116, S120-S126, S130-S134, S140-S154 and S160-S168 are not executed. It is noted that such a modification may be configured such that all of the above steps are not executed, or a part of the above steps are not executed.

In the illustrative embodiments described above, the processes shown in FIGS. 7-11 are executed as the printing application 74a is executed. These flowcharts may be modified such that steps S208, S210, S214-S218, S220-S226, S230-S234, S240-S254 and S260-S268 are not executed. It is noted that such a modification may be configured such that all of the above steps are not executed, or a part of the above steps are not executed.

The technical components as described/depicted exhibit technical usefulness individually or in any suitable combinations, which should not be limited the configurations at the time of filing the application. Further, the technical components as described/depicted could achieve a plurality of technical effects, but the technical components should be considered to have the technical usefulness if at least one of such technical effects is achieved.

It is noted that each program may include a single program module or a plurality of program modules. Any mutually exchangeable components/modules may be exchanged, and such a modification is also within a scope of the present disclosures. Computers may include ones (i.e., CPU 12, CPU 52) which executes processes based on the programs (e.g., the printing applications 32a, 74a). Alternatively or optionally, the computers may include ones which executes processes based on programs/applications other than the printing applications 32a and 74a. The computer may include hardware (e.g., panels 22 and 56) which operates in accordance with instructions issued by the computer and/or combination of the computer and hardware which operate in an associated manner. The computer may execute a plurality of programs, and execute processes in an associated manner.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on non-transitory computer-readable media including but not limited to RAMs, ROMs, flash memories, EEPROMs, CD-media, DVD-media, temporary storages, hard disk drives, floppy drives, permanent storages, and the like. Further, the storage of the programs may include storages of a server which is connectable to the mobile-phone 10 or the MFP 50 through a communication network. Further, the programs stored in the storage of such a server may be distributed as information and/or signals representing the programs through the communication network such as the Internet.

What is claimed is:

1. A non-transitory computer-readable recording medium of a mobile terminal having a near field communication unit configured to establish a near field wireless communication between the mobile terminal and a printing device and a long distance communication unit configured to establish a long distance wireless communication between the mobile terminal and the printing device, a communication distance of the long distance communication unit being longer than a communication distance of the near field communication, the recording medium storing instructions which, when executed, cause the mobile terminal to:
   establish the long distance wireless communication between the mobile terminal and the printing device in accordance with identification information, the identification information being communicated between the mobile terminal and the printing device using the near field communication;
   transmit a print command to the printing device using one of the near field communication unit and the long distance communication unit, the print command being for initiating a printing operation to print an image based on image data stored in a storage of the mobile terminal;
   determine, after the print command was transmitted, whether a distance between the mobile terminal and the printing device is equal to or greater than a threshold, the threshold being greater than a maximum communication distance required to establish the near field communication; and
   when it is determined that the distance between the mobile terminal and the printing device is equal to or greater than the threshold, transmit a print termination command instructing termination of the printing operation to the printing device using the long distance communication unit.

2. The recording medium according to claim 1,
   wherein the mobile terminal has a GPS function unit configured to receive signals from global positioning system satellites,
   wherein the instructions further cause the mobile terminal to:
   store a first position of the mobile terminal obtained based on a first signals, as a reference position of the mobile terminal, the first signals being received by the GPS function unit when the near field wireless communication is being established between the mobile terminal and the printing device, and
   determine that the mobile terminal is spaced from the printing device equal to greater than the threshold when a distance between a second position of the mobile terminal and the reference position is equal to or greater than the threshold, the second signals being received by the GPS function unit after the reference position is stored.

3. The recording medium according to claim 2,
   wherein the instructions further cause the mobile terminal to:

determine, on condition that the GPS function unit is active and in a status of receiving signals from the global positioning system satellites, whether the mobile terminal is spaced from the printing device equal to or greater than the threshold based on the position of the mobile terminal which is obtained based on the signals received by the GPS function unit; and determine, on condition of at least one of that the GPS function unit is not active and that the GPS function unit is not in the status of receiving signals from the global positioning system satellites, whether the mobile terminal is spaced from the printing device equal to or greater than the threshold based on the availability of the near field wireless connection with the printing device.

4. The recording medium according to claim 1,
wherein the long distance communication unit is configured to directly communicate with the printing device using the long distance wireless communication,
wherein the instructions further cause the mobile terminal to:
obtain a signal strength of the long distance wireless communication; and
determine whether the mobile terminal is spaced from the printing device equal to or greater than the threshold based on the obtained signal strength of the long distance wireless communication.

5. The recording medium according to claim 1,
wherein the instructions further cause the mobile terminal to determine that the mobile terminal is spaced from the printing device equal to or greater than the threshold when the near field communication with the printing device with use of the near field communication unit is disrupted after established.

6. The recording medium according to claim 5,
wherein the mobile terminal has a notification unit configured to output a notification, and
wherein the instructions further cause the mobile terminal to control, after the print command has been transmitted, the notification unit to output the notification indicating to maintain the near field wireless communication with the printing device .

7. The recording medium according to claim 1,
wherein the instructions further cause the mobile terminal to:
determine whether the mobile terminal is spaced from the printing device equal to or greater than the threshold based on the signal strength of the long distance wireless communication on condition that the long distance communication unit directly communicates with the printing device using the long distance wireless communication; and
determine whether the mobile terminal is spaced from the printing device equal to or greater than the threshold based on the availability of the near field wireless connection with the printing device on condition that the long distance communication unit communicates with the printing device using the long distance wireless communication via an access point.

8. The recording medium according to claim 1,
wherein the mobile terminal has a notification unit configured to output a notification, and
wherein the instructions further cause the mobile terminal to control, when the mobile terminal is spaced from the printing device equal to or greater than the threshold, the notification unit to output the notification indicating that the mobile terminal is spaced from the printing device equal to or greater than the threshold.

9. The recording medium according to claim 8,
wherein the instructions further cause the mobile terminal to:
transmit the print termination command to the printing device with the long distance communication unit when one of:
a prescribed period of time has elapsed since outputting the notification; and
the mobile terminal is spaced from the printing device by a distance which is equal to or greater than the threshold after outputting the notification.

10. The recording medium according to claim 1,
wherein the instructions further cause the mobile terminal to determine whether the mobile terminal is spaced from the printing device equal to or greater than the threshold when a number of sheets to be printed based on the image data is equal to or greater than a predetermined number.

11. A mobile terminal, comprising:
a near field communication unit configured to establish a near field wireless communication with a printing device within a communicable range;
a long distance communication unit configured to establish a long distance wireless communication with the printing device, a communication distance of the long distance communication unit being longer than a communication distance of the near field communication;
a storage device storing image information; and
a processor,
the processor being configured to execute instructions and cause the mobile terminal to:
establish the long distance wireless communication between the mobile terminal and the printing device in accordance with identification information, the identification information being communicated between the mobile terminal and the printing device using the near field communication;
transmit a print command to the printing device using one of the near field communication unit and the long distance communication unit, the print command being for initiating a printing operation to print an image based on image data stored in a storage of the mobile terminal;
determine, after the print command was transmitted, whether a distance between the mobile terminal and the printing device is equal to or greater than the threshold, the threshold being greater than a maximum communication distance required to establish the near field communication; and
when it is determined that the distance between the mobile terminal and the printing device is equal to or greater than the threshold, transmit a print termination command instructing termination of the printing operation to the printing device using the long distance communication unit.

12. A printing device, comprising:
a near field communication unit configured to establish a near field wireless communication with a mobile terminal within a communicable range;
a long distance communication unit configured to establish a long distance wireless communication with the mobile terminal, a communication distance of the long distance communication unit being longer than a communication distance of the near field communication;
an on-printing device processor,
the on-printing device processor being configured to execute instructions and cause the printing device to:

establish the long distance wireless communication between printing device and the mobile terminal in accordance with identification information, the identification information being communicated between the printing device and the mobile terminal using the near field communication;

obtain a print command to initiate a printing operation to print an image based on image data obtained from the mobile terminal using one of the near field communication unit and the long distance communication unit;

output information to execute printing images based on the image information obtained from the mobile terminal after the print command is obtained;

determine whether a distance between the mobile terminal and the printing device is equal to or greater than a threshold, the threshold being greater than a maximum communication distance required to establish the near field communication after printing is executed based on the print command obtained from the mobile terminal; and output information to stop printing images based on the image information obtained from the mobile terminal using the long distance communication unit when it is determined that the distance between the mobile terminal and the printing device is equal to greater than the threshold.

13. The printing device according to claim 12,
wherein the mobile terminal has a GPS function unit configured to receive signals from global positioning system satellites,
wherein the instructions further cause the on-printing device processor to:
receive position information of the mobile terminal from the mobile terminal through the long distance communication unit; and
store a first position of the mobile terminal obtained based on a first signals, as a reference position of the mobile terminal, the first signals being received by the GPS function unit when the near field wireless communication is being established between the mobile terminal and the printing device, and
determine that the mobile terminal is spaced from the printing device equal to or greater than the threshold when a distance between a second position of the mobile terminal and the reference position is equal to or greater than the threshold, the second signals being received by the GPS function unit after the reference position is stored.

14. The printing device according to claim 12,
wherein the long distance communication unit is configured to directly communicate with the mobile terminal using the long distance wireless communication,
wherein the instructions further cause the on-printing device processor to:
obtain a signal strength of the long distance wireless communication; and
determine whether the mobile terminal is spaced from the printing device equal to or greater than the threshold based on the obtained signal strength of the long distance wireless communication.

15. The printing device according to claim 12,
wherein the instructions further cause the on-printing device processor to determine that the mobile terminal is spaced from the printing device equal to or greater than the threshold when the near field communication with the mobile terminal with use of the near field communication unit is disrupted after established.

16. The printing device according to claim 12,
wherein the printing device has a second notification unit configured to output a notification, and
wherein the instructions further cause the on-printing device processor to:
control, after the print command has been transmitted, the second notification unit to output the notification directed to the user when the mobile terminal is spaced from the printing device equal to or greater than the threshold;
output the print termination command to terminate printing images based on the image information obtained from the mobile terminal when one of:
the notification directed to the user by the second notification unit has been continuously executed for a prescribed period of time; and
the mobile terminal is spaced from the printing device by a distance which is equal to or longer than the threshold after the notification directed to the user by the second notification unit was executed.

* * * * *